United States Patent [19]

Clough et al.

[11] Patent Number: 5,407,743
[45] Date of Patent: Apr. 18, 1995

[54] ZINC OXIDE COATED SUBSTRATES

[75] Inventors: Thomas J. Clough, Santa Monica; Victor L. Grosvenor, Topanga; Naum Pinsky, Thousand Oaks, all of Calif.

[73] Assignee: Ensci, Inc., Pismo Beach, Calif.

[21] Appl. No.: 183,999

[22] Filed: Jan. 18, 1994

Related U.S. Application Data

[60] Division of Ser. No. 743,738, Aug. 12, 1991, Pat. No. 5,306,522, which is a continuation-in-part of Ser. No. 621,660, Dec. 3, 1990, Pat. No. 5,204,140, which is a continuation-in-part of Ser. No. 348,789, May 8, 1989, Pat. No. 5,167,820, and Ser. No. 348,788, May 8, 1989, Pat. No. 5,039,845, and Ser. No. 348,787, May 8, 1989, abandoned, and Ser. No. 348,786, May 8, 1989, Pat. No. 5,182,165, each and Ser. No. 272,539, is a continuation-in-part of Ser. No. 82,277, Aug. 6, 1987, Pat. No. 4,787,125, which is a division of Ser. No. 843,047, Mar. 24, 1986, Pat. No. 4,713,306.

[51] Int. Cl.$^6$ ............................................. B32B 19/00
[52] U.S. Cl. .................................. 428/357; 428/389; 428/402; 428/403
[58] Field of Search ............... 428/357, 288, 402, 403, 428/389

[56] References Cited

PUBLICATIONS

Chemical Abstracts 86:9006q1; 86:131703e2; 88:12338w3; 88:11368z4; 89:9827e5; 90:15095s6; 91:31084p7; 91:66904k8; 91:79473s9; 92:50625c10; 92:208311j11; 93:17333d12; 93:58202d13; 93:58203e14; 93:58945y15; 93:214257h16; 93:229175d17; 93:246009v18; 94:50173v19; 95:9388b20; 95:5321w21; 95:107827p22; 95:14255v23; 95:16049e24; 95:174289c25; 95:195176d16; 95:198559p27; 97:98957e28; 97:118745c29; 97:228221m30; 98:135748u31; 98:153257n32; 100:166098w33; 101:120448c34; 101:220476d35; 102:123654y36; 103:30889j37; 105:15955a38; 105:144268c39; 105:162935x40; 105:201257w41; 105:236522j42; 101:82194g90; 86:149290k43; 86:163940w44; 88:81575h45; 89:189576u46; 90:96488z47; 90:20639u48; 91:31663b49; 93:195315h50; 94:93647v51; 94:113303z52; 94:130934r53; 95:23459p54; 95:86993v55; 95:14199x56; 96:59727c57; 96:226542x58; 99:79996e59; 99:222602f60; 100:23242c61; 100:165492h62; 102:7863s63; 103:112519c64; 103:179389d65; 104:20458x66; 104:60384d67; 105:161414q68; 106:89234g69; 86:80761n70; 88:123707k71; 89:137597g72; 89:200323g73; 90:41263q74; 90:159023q75; 91:221145g76; 94:143682n77; 95:9365s78; 95:95:160274g79; 103:39850x80.

"Photo-Induced Catalytic Reactions of Alcohols on Zinc Oxide Suspensions in Cyclohexane: Oscillation in the Concentration of Hydrogen Peroxide Formed," J. C. Kuriacose, et al, Indian J: Chem., vol. 16A, Mar. 1978, p. 254–256.

"Effect of Naphthalene, Phenanthrene & Fluorene on the Photoinduced Reaction of Benzhydrol, Benzyl AAlcohol & Isopropanol on Zinc Oxide," E. P. Yesodrharan, et al, Indian J. Chem., vol. 15B, Sep. 1977, pp. 844–846.

"Conversion of Isopropyl Alcohol to Acetone on Irradiated Zinc Oxide*," Joseph C. Kuriacose, et al, Journal of Catalysis 1, 498–507 (1962), pp. 498–507.

Primary Examiner—James J. Bell
Attorney, Agent, or Firm—Frank J. Uxa, Jr.

[57] ABSTRACT

Processes for coating substrates, in particular substrates including shielded surfaces, with zinc oxide-containing coatings are disclosed. Such processes comprise contacting a substrate with a zinc oxide precursor, preferably maintaining the precursor coated substrate at conditions to equilibrate the coating, and then oxidizing the precursor to form a substrate containing zinc oxide. Also disclosed are substrates coated with zinc oxide-containing coatings for use in various applications.

22 Claims, 3 Drawing Sheets

ZINC OXIDE COATED SUBSTRATES

RELATED APPLICATIONS

This application is a Div. of Ser. No. 07/743,738 filed on Aug. 12, 1991, (now U.S. Pat. No. 5,306,522) which is a continuation in part of application Ser. No. 621,660 filed Dec. 3, 1990, now U.S. Pat. No. 5,204,140, which application in turn is a continuation-in-part of application Ser. Nos. 348,789, U.S. Pat. No. 5,167,820; 348,788, U.S. Pat. No. 5,039,845; 348,787, abandoned and 348,786, U.S. Pat. No. 5,182,165, each filed May 8, 1989, each of which applications is a continuation-in-part of application Ser. Nos. 272,517 and 272,539, each filed Nov. 17, 1988, now abandoned, each of which applications in turn, is a continuation-in-part of application Ser. No. 082,277, filed Aug. 6, 1987 (now U.S. Pat. No. 4,787,125) which application, in turn, is a division of application Ser. No. 843,047, filed Mar. 24, 1986, now U.S. Pat. No. 4,713,306. Each of these earlier filed applications and these U.S. Patents is incorporated in its entirety herein by reference.

BACKGROUND OF THE INVENTION

The present invention relates to a process for coating a substrate. More particularly, the invention relates to coating a substrate with a zinc oxide-containing material, preferably an electrically conductive zinc oxide-containing material.

An application where substrates with coatings, e.g., electrically conductive coatings, find particular usefulness is in the promotion of chemical reactions, e.g., gas/liquid phase reactions, electro catalytic reactions, photo catalytic reactions, redox reactions, etc. As an example of a type of reaction system, a catalytic, e.g., metallic, component is contacted with the material to be reacted, e.g., an aliphatic alcohol is passed through or near to the catalytic component to enhance the chemical reaction, e.g., the dehydrogenation to a ketone. In addition, using a substrate for the catalytic component which is coated with an electrically conductive material is highly advantageous for electro and photo electro catalysis since a field/current can be effectively and efficiently provided to or near the catalytic component for electron transfer reactions. Many types of chemical reactions can be advantageously promoted using such coated substrates. Zinc-oxide containing coatings on substrates may promote electron transfer whether or not the chemical reaction is conducted in the presence of a electro, photo electro current or field. In addition, zinc oxide coated substrates and sintered zinc dioxides are useful as gas sensors, optically transparent conductive films and acoustic biezo transducer type devices and articles. One or more other components, e.g., metal components, are often included in certain of these applications.

In many of the above-noted applications it would be advantageous to have an electrically, electronically conductive; electro mechanical zinc oxide which is substantially uniform, has high electronic conductivity, and has good chemical properties, e.g., morphology, stability, etc.

A number of techniques may be employed to provide conductive zinc oxide coatings on substrates. For example, the chemical vapor deposition (CVD) process may be employed. This process comprises contacting a substrate with a vaporous composition comprising a zinc component and a dopant-containing material and contacting the contacted substrate with an oxygen-containing vaporous medium at conditions effective to form the doped zinc oxide coating on the substrate. Conventionally, the CVD process occurs simultaneously at high temperatures at very short contact times so that zinc oxide is initially deposited on the substrate. However zinc oxide can form off the substrate resulting in a low reagent capture rate. The CVD process is well known in the art for coating a single flat surface which is maintained in a fixed position during the above-noted contacting steps. The conventional CVD process is an example of a "line-of-sight" process or a "two dimensional" process in which the zinc oxide is formed only on that portion of the substrate directly in the path of the zinc source as zinc oxide is formed on the substrate. Portions of the substrate, particularly internal surfaces, which are shielded from the zinc oxide being formed, e.g., such as pores which extend inwardly from the external surface and substrate layers which are internal at least partially shielded from the depositing zinc oxide source by one or more other layers or surfaces closer to the external substrate surface being coated, do not get uniformly coated, if at all, in a "line-of-sight" process. Such shielded substrate portions either are not being contacted by the zinc source during line-of-sight processing or are being contacted, if at all, not uniformly by the zinc source during line-of-sight processing. A particular problem with "line-of-sight" processes is the need to maintain a fixed distance between the zinc source and the substrate. Otherwise, zinc dioxide can be deposited or formed off the substrate and lost, with a corresponding loss in process and reagent efficiency.

One of the preferred substrates for use in electro mechanical devices, such as transducers, are inorganic substrate, in particular flakes, spheres, fibers and other type particles. Although the CVD process is useful for coating a single flat surface, for the reasons noted above this process tends to produce non-uniform and/or discontinuous coatings on non-flat, non-non-equidistant surfaces. Such non uniformities and/or discontinuities are detrimental to the electrical, optical, acoustic and chemical properties of the coated substrate. A new process, e.g., a "non-line-of-sight" or "three dimensional" process, useful for coating such substrates would be advantageous. As used herein, a "non-line-of-sight" or "three dimensional" process is a process which coats surfaces of a substrate with zinc oxide which surfaces would not be directly exposed to vaporous or other zinc oxide-forming compounds being deposited on the external surface of the substrate during the first contacting step. In other words, a "three dimensional" process coats coatable substrate surfaces which are at least partially shielded by other portions of the substrate which are closer to the external surface of the substrate and/or which are further from the zinc oxide forming source during processing, e.g., the internal and/or opposite side surfaces of a glass or ceramic fiber or spheres, or flakes or other shapes or surfaces.

Although a substantial amount of work has been done, there continues to be a need for a new method for coating substrates, particularly three dimensional substrates with doped zinc oxide. The prior art processes described below follow conventional processing techniques such as by sintering of zinc oxide and or the instantaneous conversion to zinc oxide by spray pyrolyis.

For example, in "Formulation of electrically conductive, thermal-control coatings" by Shai, Michal C. (Goddard Space Flight Cent., NASA, Greenbelt, Md. USA) NASA Tech Memo. 1977, NASA TM-X-73537, three materials for electrical conductor thermal coatings of the International Sun Earth Explorer satellite were studied. Combinations of ZnO, $Al_2O_3$, $Co_3O_4$, and Na or K silicate were used. The coatings were fabricated by stirring oxide aqueous slurries for 5 hours, heating 48 hours at 90° C., 72 hours at 110° C., and firing at 1175° C. for 15 minutes. Coatings were satisfactory for these conventionally prepared ZnO materials.

In the "Study of the Hall effect in the chemisorption of molecular oxygen on zinc oxide," Garcia de la Banda, J. F.; Canosa, B.; Fernandez, M.; Pajarea J. Zh. Fiz. Khim. 1979, 53(11), 2895-900 (Russ), the effect of thermal pretreatment (600°-900° C. in air) and doping (<0.1 weight % Ga) was studied on the thickness of a subsurface electron depleted layer which forms due to chemisorption of O on polycryaline. ZnO. The current carriers decreased with the increase of temperature during the preliminary thermal treatment owing to the atmosphere 0 penetration and reaction with Zn atoms. The limiting layer thickness found was zero when treated at 900° C. and it reaches 800-1700 Ao when treated at 800°-700° C. The samples treated at 600° C. lose 99% current carriers owing to 0 chemisorption.

In "Electroconductive zinc oxide" Muramoto Makoto; Ishida, Nobuyuki; Matsushita, Fujio Japan Kokai Tokyo Kobe 80 10,478 (CL C01G9/02), 24 Jan. 1980, Application. 78/84,812, electroconductive ZnO powder useful in preparing coatings for electrostatic recording, electrorecording, electrical discharge recording, and facsimile recording were obtained by sintering a ZnO-$Al_2O_3$ (100:0.05-2.5 mol ratio) mixture at 800°-1000° C. in the presence of C and cooling to $\leq 20$ nm. Thus, ZnO and $Al_2O_3$ were mixed in a 100:0.5 mol ratio, the mixture (30 parts) was placed on a layer of charcoal pellets (8 parts) in a crucible, sintered at 1000° C. for 1 h, and cooled in a nitrogen stream to give a powder having a volume resistivity of $2.7 \times 10^3$ ohm-cm.

In "Manufacture of electrically conducting fine zinc oxide." Nihon Kagaku Sangyo Co., Ltd., Japan Kokai Tokyo Kobe 81 69.266 (CL C04B35/00), 10 Jun. 1981, Application 79/141,989, 06 Nov. 1979; an electrically conducting fine powder ZnO useful for electrostatic recording paper is prepared from an aqueous solution containing a Zn salt and a compound selected from $Al_2O_3$, Sn oxide, Co oxide, Cr oxide, Ti oxide, Ge oxide, Ga oxide, and In oxide by neutralizing the materials, presintering, and sintering in gas at 600°-1000° C. Thus, $ZnCl_2$ 170 and $AlCl_3$ 13.5 g were dissolved in 1 liter of $H_2O$ and 14% $NH_4OH$ was slowly added to adjust the pH to 8.12. The material was filtered, dried, heated, at 450° C. for 1 hour and sintered in a nitrogen gas at 800° C. for 60 minutes to obtain 94 g of an electrically conductive ZnO having an intrinsic resistivity of $6.7 \times 10$.

In "Preparation of zinc oxide conductors." Shiromizu Kagaku Kogyo K. K. Japan Kokaj Tokyo Kobe JP 83,161.923 [83,161,923] (CL C01G9/00), 26 Sep. 1983, Application 82/41,947, 17 Mar. 1982; ZnO (100 parts) and a compound (0.5-20 parts) selected from $Al_2O_3$, Ti oxide, and Sn oxide (or their compounds which give oxides upon thermal decomposition) are treated in an aqueous medium in the presence of compound (5-100 parts) selected from $(NH_4)_2CO_2$, $NH_4HCO_3$, $NH_4Cl$, $NH_4NO_2$ $(NH_4)_2SO_4$, and urea. The treated mixture is fired in a reducing atmosphere to give conductive ZnO. ZnO (100 g) was dispersed in $H_2O$, then a mixture of $(NH_4)_2CO_2$ (130 g) and $Al_2(SO_4)_2$ (5 g as octahydrate) solution was added and the dispersion heated to 60° C. The mixture was then filtered and the filter cake fired at 800° to give an Al-doped ZnO having good conductivity. The conductor was useful in preparing electrostatic imaging sheets.

In "Thin-film surface-acoustic-wave devices." Mitsuyu, Tsuneo; Ohji, Kenzo; Ono, Shusuke; Yamazaki, Osamu; Wasa, Kiyotaka (Mater. Res. Lab., Matsushita Electr. Ind. Co., Osaka, Japan), Natl. Tech. Rep. ((Matsushita Electr. Ind. Co., Osaka) 1976, 22(6), 905-23 (Japan), highly oriented radio-frequency sputtered films of ZnO and $Bi_{12}PbO_{19}$ were prepared. A hemispherical electrode configuration was very effective in orienting ZnO in the c axis on a glass plate. The obtained electromechanical coupling factor was up to 88% of the bulk single-crystal value.

In "Antistatic plastic films." Fuji Photo Film Co., Ltd. Japan Kokai Tokyo Kobe JP 58 63,726[83 63,726] (CL C08J7/04), 15 Apr. 1983, Application 81/161,294, 09 Oct. 1981; antistatic coatings on plastic films are formed in such a manner that the surface of the antistatic layers containing $\geq 1$ c/c powder selected from oxides of Zn, Ti, Sn, In, Si, Mo and W, and their composite oxides exhibits a citron-skin like structure. Such a surface structure can be formed by using a mixture of solvents having different evaporation rates. The antistatically treated films are especially useful as photographic film supports. Thus, a conductive $SnO_2$-$Sb_2O_3$ composite and styrene-maleic anhydride copolymer were mixed in MeOH, $Me_2CO$, and ethyl cellosolve and the mixture was coated on poly(ethylene terephthalate) film precoated with a cellulose acetate and polyester, to give an electrically conductive layer with a citron skin-like structure.

In "Electrostatic recording materials." Oji Paper Co., Ltd. Japan Kokai Tokyo Kobe JP 58 04,132 [83 04,152] (Cl.G03G5 08) 11 Jan. 1983. Application 81,101,305, 01 Jul. 1981; electrostatic recording materials having a conductor layer made of a binder and conductive ZnO prepared by calcination of a mixture of ZnO, $Al_2O_3$ or Al compound which can be converted to $Al_2O_3$ by calcination, and S at 600°-900° C. The ZnO, $Al_2O_3$, and S 1.0 mol/100 mol ZnO were calcined at 800° C. to give conductive ZnO powder having good whiteness. The ZnO powder was dispersed in a polyvinyl alcohol solution coated on a paper support, having an acrylic resin and $CaCO_3$ to form a dielectrical layer on the conductor layer. The resultant electrostatic recording paper had good whiteness and recording characteristics.

In "Optical and electronic properties of zinc oxide films prepared by spray pyrolysis." Major S.; Banerjee, A; Chopra, K. I. (Cent. Energy Stud., Indian Inst. Technol., New Delhi, 110016 India.) Thin Solid Films 1985, 125(0 2). 179-85 the optical properties of transparent conducting ZnO films prepared by spray pyrolysis were studied in the UV visible and IR regions. The specular reflectance and transmittance data were used to determine the optical constants which correlate well with the data on single-crystal ZnO in the visible region. The films doped with 3 weight % indium exhibit thermal stability up to 650K in vacuum and up to 450K in O ambients. The changes in the electronic properties of pure ZnO films on annealing in O and vacuum were attributed to chemisorption and desorption of O at grain boundaries.

SUMMARY OF THE INVENTION

A new process for at least partially coating a substrate with a zinc oxide-forming material has been discovered. In brief, the process comprises contacting the substrate with a zinc oxide precursor, for example, zinc chloride, in a vaporous form and/or in a liquid form and/or in a solid (e.g., powder) form, to form a zinc oxide precursor-containing coating, for example, a zinc chloride-containing coating, on the substrate; preferably contacting the substrate with a dopant component, i.e., a component containing for example aluminum, cobalt, gallium, titanium, indium, zinc, germanium, chromium (as in a compound), to form a doped component-containing coating on the substrate; and contacting the coated substrate with an oxidizing agent to form a zinc oxide-containing, coating on the substrate. The contacting of the substrate with the zinc oxide precursor and with the dopant component can occur together, i.e., simultaneously, and/or in separate steps.

This process can provide coated substrates which have substantial electrical conductivity so as to be suitable for use as components in optical, acoustic and sensor devices, such as transducers. Substantial coating uniformity, e.g., in the thickness of the zinc oxide-containing coating and in the distribution of dopant component in the coating, is obtained. Further, the present doped zinc oxide coated substrates have outstanding stability, e.g., in terms of electrical optical, acoustic and mechanical properties and morphology, and are thus useful in various applications. In addition, the process is efficient in utilizing the materials which are employed to form the coated substrate.

DETAILED DESCRIPTION OF THE INVENTION

In one broad aspect, the present coating process comprises contacting a substrate with a composition comprising a zinc oxide precursor, such as zinc chloride, zinc complexes, i.e. zinc acetate, zinc acetyl acetonate, and mixtures thereof, preferably zinc chloride, at conditions, preferably substantially non-deleterious oxidizing conditions, more preferably in a substantially inert environment or atmosphere, effective to form a zinc oxide precursor-containing coating, such as a zinc chloride-containing coating, on at least a portion of the substrate. The substrate is preferably also contacted with at least one dopant-forming component, such as at least one aluminum, indium, gallium or zinc component, at conditions, preferably substantially non-deleterious oxidizing conditions, more preferably in a substantially inert atmosphere, effective to form a dopant-forming component-containing coating, such as an aluminum, indium, gallium or zinc component-containing coating, on at least a portion of the substrate. This substrate, including one or more coatings containing zinc oxide precursor, for example zinc chloride and preferably a dopant-forming component, for example an aluminum, indium, gallium or zinc component, is contacted with at least one oxidizing agent at conditions effective to convert the zinc oxide precursor to zinc oxide and form a zinc oxide-containing, coating, preferably a doped, e.g., aluminum, indium, gallium or tin oxide-containing coating, on at least a portion of the substrate. By "non-deleterious oxidation" is meant that the majority of the oxidation of zinc oxide precursor, for example zinc chloride, coated onto the substrate takes place in the oxidizing agent contacting step of the process, after distribution, and/or equilibration of the precursor rather than in process step or steps conducted at non-deleterious oxidizing conditions. The process as set forth below will be described in many instances with reference to zinc chloride, which has been found to provide particularly outstanding process and product properties. However, it is to be understood that other suitable zinc oxide precursors are included within the scope of the present invention.

The dopant-forming component-containing coating may be applied to the substrate before and/or after and/or during the time the substrate is coated with zinc chloride. In a particularly useful embodiment, the zinc chloride and the dopant-forming component are both present in the same composition used to contact the substrate so that the zinc chloride-containing coating further contains the dopant-forming component. This embodiment provides processing efficiencies since the number of process steps is reduced (relative to separately coating the substrate with zinc chloride and dopant-forming component). In addition, the relative amount of zinc chloride and dopant-forming component used to coat the substrate can be effectively controlled in this "single coating composition" embodiment of the present invention.

In another useful embodiment, the substrate with the zinc chloride-containing coating and the dopant-forming component-containing coating is maintained at conditions, preferably at substantially non-deleterious oxidizing conditions, for example, conditions which reduce and/or minimize the formation of zinc oxide on a relatively small portion of the substrate or off the substrate, for a period of time effective to do at least one of the following: (1) coat a larger portion of the substrate with zinc chloride-containing coating; (2) distribute the zinc chloride coating over the substrate; (3) make the zinc chloride-containing coating more uniform in thickness; and (4) distribute the dopant-forming component more uniformly in the zinc chloride-containing coating. Such maintaining preferably occurs for a period of time in the range of about 0.05 or 0.1 minute to about 20 minutes in the presence of an inert gas and/or oxygen i.e. air, under non-deleterious oxidizing conditions. Such maintaining is preferably conducted at the same or a higher temperature relative to the temperature at which the substrate/zinc chloride-containing composition contacting occurs. Such maintaining, in general, acts to make the coating more uniform and, thereby, for example, provides for beneficial electrical conductivity properties. The thickness of the zinc oxide-containing coating is preferably in the range of about 0.1 micron to about 10 microns, more preferably about 0.25 micron to about 1.25 microns.

The zinc chloride which is contacted with the substrate is in a vaporous phase or state, or in a liquid phase or state, or in a solid state or phase (powder) at the time of the contacting. The composition which includes the zinc chloride preferably also includes the dopant-forming component or components. This composition may also include one or more other materials, e.g., dopants, catalysts, grain growth inhibitors, solvents, etc., which do not substantially adversely promote the premature hydrolysis and/or oxidation of the zinc chloride and/or the dopant-forming component, and do not substantially adversely affect the properties of the final product, such as by leaving a detrimental residue in the final product prior to the formation of the zinc oxide-containing coating. Thus, it has been found to be important, e.g., to obtaining a zinc oxide coating with good structural, mechanical and/or electronic properties, that undue hydrolysis of the zinc chloride and dopant-forming component be avoided. This is contrary to certain of the prior art which actively utilized the simultaneous hydrolysis reaction as an approach to form the final coating. Examples of useful other materials include organic components such as acetonitrile, ethyl acetate, dimethyl sulfoxide, propylene carbonate and mixtures thereof; certain inorganic salts and mixtures thereof. These other materials, which are preferably substantially anhydrous, may often be considered as a carrier, e.g., solvent, for the zinc chloride and/or dopant-forming component to be contacted with the substrate. It has also been found that the substrate can first be contacted with a zinc oxide precursor powder, particularly zinc chloride powder, preferably with a film forming amount of such powder, followed by increasing the temperature of the powder to the liquidus point of the powder on the substrate and maintaining the coated substrate for a period of time at conditions including the increased temperature effective to do at least one of the following: (1) coat a larger portion of the substrate with the zinc oxide precursor-containing coating; (2) distribute the coating over the substrate; and (3) make the coating more uniform in thickness. Preferably, this step provides for the equilibration of the coating on the substrate. The size distribution of the powder, for example, zinc chloride powder, and the amount of such powder applied to the substrate are preferably chosen so as to distribute the coating over substantially the entire substrate.

The zinc oxide precursor powder can be applied to the substrate as a powder, particularly in the range of about 5 or about 10 to about 125 microns in average particle size the size in part being a function of the particle size, i.e. smaller particles generally require smaller size powders. The powder is preferably applied as a charged fluidized powder, in particular having a charge opposite that of the substrate or at a temperature where the powder contacts and adheres to the substrate rate. In carrying out the powder coating, the coating system can be, for example, one or more electrostatic fluidized beds, spray systems having a fluidized chamber, and other means for applying powder, preferably in a film forming amount. The amount of powder used is generally based on the thickness of the desired coating and incidental losses that may occur during processing. The powder process together with conversion to a zinc oxide-containing coating can be repeated to achieve desired coating properties, such as desired gradient conductivities.

Typically, the fluidizing gaseous medium is selected to be compatible with the zinc oxide precursor powder, i.e., to not substantially adversely affect the formation of a coating on the substrate during melting and ultimate conversion to a zinc oxide-containing film.

Generally, gases such as air, nitrogen, argon, helium and the like, can be used, with air being a gas of choice, where no substantial adverse prehydrolysis or oxidation reaction of the powder precursor takes place prior to the oxidation-reaction to the zinc oxide coating as previously discussed under equilibration and maintaining. The gas flow rate is typically selected to obtain fluidization and charge transfer to the powder. Fine powders require less gas flow for equivalent deposition. It has been found that small amounts of water vapor enhance charge transfer. The temperature of the powder precursor is generally in the range of about 0° C. to about 100° C., or higher more preferably about 20° C. to about 40° C., and still more preferably about ambient temperature. The substrate however, can be at a temperature the same as, higher or substantially higher than the powder.

The time for contacting the substrate with precursor powder is generally a function of the substrate bulk density, thickness, powder size and gas flow rate. The particular coating means is selected in part according to the above criteria, particularly the geometry of the substrate. For example, particles, spheres, flakes, short fibers and other similar substrate, can be coated directly in a fluidized bed themselves with such substrates being in a fluidized motion or state. For fabrics and rovings a preferred method is to transport the fabric and/or roving directly through a fluidized bed for powder contacting. In the case of rovings, a fiber spreader can be used which exposes the filaments within the fiber bundle to the powder. The powder coating can be adjusted such that all sides of the substrate fabric, roving and the like are contacted with powder. Typical contacting time can vary from seconds to minutes, preferably in the range of about 1 second to about 120 seconds, more preferably about 2 seconds to about 30 seconds.

Typical zinc oxide precursor powders are those that are powders at powder/substrate contacting conditions and which are liquidus at the maintaining conditions, preferably equilibration conditions, of the present process. It is preferred that the powder on melting substantially wets the surface of the substrate, preferably having a low contact angle formed by the liquid precursor in contact with the substrate and has a relatively low viscosity and low vapor pressure at the temperature conditions of melting and maintaining, preferably melting within the range of about 100° C. to about 450° C., or higher, more preferably about 250° C. to about 400° C. Typical powder zinc oxide precursors are zinc chloride, low molecular weight organic salts or complexes of zinc, particularly low molecular weight organic salts and complexes such as zinc acetate and acetylacetonate complexes of zinc.

An additional component powder, such as a dopant-forming powder, can be combined with the zinc oxide precursor powder. Particularly preferred dopant-forming powders are aluminum and chromium acetylacetonate, benzylate and methyl substituted benzylate, cobalt II chloride, gallium dichloride, indium mono and dichloride, stannous chloride and germanium monoxide. Further, an additional component, such as a dopant, for example a chloride component, aluminum or titanium, can be incorporated into the coating during the maintaining step, for example aluminum chloride, titanium tetrachloride gas as a source of the metal dopant, preferably in a hydrogen chloride atmosphere. A combination of the two methods can also be used for additional component incorporation.

The powder zinc oxide precursor on melting is maintained and/or equilibrated as set forth above. In addition, temperatures can be adjusted and/or a component introduced into the melting/maintaining step which can aid in altering the precursor for enhanced conversion to zinc oxide. For example, gaseous hydrogen chloride can be introduced to form partial or total halide salts and/or the temperature can be adjusted to enhance decomposition of, for example, zinc or dopant organic salts and/or complexes to more readily oxidizable zinc compounds. The dopant can also be present in an oxide or precursor form in the melt as a dispersed preferably as a finely dispersed solid. The oxide can be incorporated advantageously as part of the powder coating of the substrate material.

A fluidizable coated substrate, such as substrates coated directly in a fluid bed of powder, can be subjected to conditions which allow liquidus formation by the zinc oxide precursor and coating of the substrate. A particularly preferred process uses a film forming amount of the zinc oxide precursor which allows for coating during the liquidus step of the process, and which substantially reduces detrimental substrate agglomeration. The conditions are adjusted or controlled to allow substantially free substrate fluidization and transport under the conditions of temperature and bed density, such as dense bed density to lean bed density. The coated substrate can be further transported to the oxidation step for conversion to zinc oxide or converted directly to zinc oxide in the same reactor/processing system. A particularly preferred embodiment is the transport of the liquidus coated substrate as a dense bed to a fluidized oxidation zone, such zone being a fluidized zone preferably producing a conversion to zinc oxide on the substrate of at least about 80% by weight.

The zinc chloride and/or dopant-forming component to be contacted with the substrate may be present in a molten state. For example, a melt containing molten zinc chloride and/or dopant metal compound may be used. The molten composition may include one or more other materials, having properties as noted above, to produce a mixture, e.g., a eutectic mixture, having a reduced melting point and/or boiling point. The use of molten zinc chloride and/or dopant-forming component provides advantageous substrate coating while reducing the handling and disposal problems caused by a solvent. In addition, the substrate is very effectively and efficiently coated so that coating material losses are reduced.

The zinc chloride and/or dopant-forming component to be contacted with the substrate may be present in a vaporous state. As used in this context, the term "vaporous state" refers to both a substantially gaseous state and a state in which the zinc chloride and/or dopant-forming component are present as drops or droplets and/or mist in a carrier gas, i.e., an atomized state. Liquid state zinc chloride and/or dopant-forming component may be utilized to generate such vaporous state compositions.

In addition to the other materials, as noted above, the composition containing zinc chloride and/or the dopant-forming component may also include one or more grain growth inhibitor components. Such inhibitor component or components are present in an amount effective to inhibit grain growth in the zinc oxide-containing coating. Reducing grain growth leads to beneficial coating properties, e.g., higher electrical conductivity, more uniform morphology, and/or greater overall stability. Among useful grain growth inhibitor components are components which include at least one metal, in particular potassium, calcium, magnesium, silicon and mixtures thereof. Of course, such grain growth inhibitor components should have no substantial detrimental effect on the final product.

The dopant-forming component may be deposited on the substrate separately from the zinc chloride, e.g., before and/or during and/or after the zinc chloride/substrate contacting. If the dopant-forming component is deposited on the substrate separately from the zinc chloride, it is preferred that the dopant-forming component, for example, the aluminum or titanium component, be deposited after the zinc chloride, such as to form soluble and/or eutectic mixtures and/or dispersion.

Any suitable dopant-forming component may be employed in the present process. Such dopant-forming component should provide sufficient dopant so that the final doped zinc oxide coating has the desired properties, e.g., electronic conductivity, stability, etc. Aluminum, cobalt, gallium, titanium, indium, tin, germanium and reduced zinc, i.e., zinc metal forming components, or conditions components are particularly useful dopant-forming components. Care should be exercised in choosing the dopant-forming component or components for use. For example, the dopant-forming component should be sufficiently compatible with the zinc chloride so that the desired doped zinc oxide coating can be formed. Dopant-forming components which have excessively high boiling points and/or are excessively volatile (relative to zinc chloride), at the conditions employed in the present process, are not preferred since, for example, the final coating may not be sufficiently doped and/or a relatively large amount of the dopant-forming component or components may be lost during processing. It may be useful to include one or more property altering components, e.g., boiling point depressants, in the composition containing the dopant-forming component to be contacted with the substrate. Such property altering component or components are included in an amount effective to alter one or more properties, e.g., boiling point, of the dopant-forming component, e.g., to improve the compatibility or reduce the incompatibility between the dopant-forming component and zinc chloride.

Particularly useful dopant components for use in the present invention are selected from aluminum, cobalt, gallium, titanium and indium oxide forming dopant components, as well as zinc metal forming compounds and/or the use of such process condition which form dopant concentrations of zinc metal. Preferred dopant oxide precursors are set for above and include the halide, preferably the chlorides, organic complexes, such as low molecular weight organic acid salts, complexes, such as low molecular weight, ketone components, preferably 2, 5, alkoxides, benzylates and the like. The preferred dopants are those that provide for optimum dopant oxide incorporation while minimizing dopant precursor losses, particularly under the preferred process condition as set forth herein. Oxides or suboxides can also be used where dopant incorporation is accomplished during the oxidation sintering contacting step.

The use of a dopant is an important feature of certain aspects of the present invention. First, it has been found that fluorine dopants can be effectively and efficiently incorporated into the zinc oxide-containing coating. In addition, such dopants act to provide zinc oxide-containing coatings with good electronic properties referred to above, morphology and stability.

The liquid, e.g., molten, composition which includes zinc chloride may, and preferably does, also include the dopant-forming component. In this embodiment, the dopant-forming component or components are preferably soluble and/or dispersed homogeneously in the composition. Vaporous mixtures of dopant chlorides and zinc oxide forming components may also be used. Such compositions are particularly effective since the amount of dopant in the final doped zinc oxide coating can be controlled by controlling the make-up of the composition. In addition, both the zinc chloride and dopant-forming component are deposited on the substrate in one step. Moreover, if chlorides are used, such chloride components provide the dopant and are converted to oxides during the oxidizing agent/substrate contacting step. This enhances the overall utilization of the coating components in the present process. Particularly useful final zinc oxide compositions comprise about 0.1% to about 5%, more preferably about 0.5% to about 3%, by weight of dopant oxide.

In one embodiment, a vaporous zinc chloride composition is utilized to contact the substrate, and the composition is at a higher temperature than is the substrate. The make-up of the vaporous zinc chloride-containing composition is such that zinc chloride condensation occurs on the cooler substrate. If the dopant-forming component is present in the composition, it is preferred that such dopant-forming component also condense on the substrate. The amount of condensation can be controlled by controlling the chemical make-up of the vaporous composition and the temperature differential between the composition and the substrate. This "condensation" approach very effectively coats the substrate to the desired coating thickness without requiring that the substrate be subjected to numerous individual or separate contactings with the vaporous zinc chloride-containing composition. As noted above, previous vapor phase coating methods have often been handicapped in requiring that the substrate be repeatedly recontacted in order to get the desired coating thickness. The present "condensation" embodiment reduces or eliminates this problem.

The substrate including the zinc chloride-containing coating and the dopant-forming component-containing coating is contacted with an oxidizing agent at conditions effective to convert zinc chloride to zinc oxide, preferably substantially zinc dioxide, and form a doped zinc oxide coating on at least a portion of the substrate. Water, e.g., in the form of a controlled amount of humidity, can be present provided that substantial deleterious changes in final zinc oxide properties are controlled and/or minimized during the coated substrate/oxidizing agent contacting. Any suitable oxidizing agent may be employed, provided that such agent functions as described herein. Preferably, the oxidizing agent (or mixtures of such agents) is substantially gaseous at the coated substrate/oxidizing agent contacting conditions. The oxidizing agent preferably includes reducible oxygen, i.e., oxygen which is reduced in oxidation state as a result of the coated substrate/oxidizing agent contacting. More preferably, the oxidizing agent comprises molecular oxygen, either alone or as a component of a gaseous mixture, e.g., air.

The substrate may be composed of any suitable material and may be in any suitable form. Preferably, the substrate is such so as to minimize or substantially eliminate the migration of ions and other species, if any, from the substrate to the zinc oxide-containing coating which are deleterious to the functioning or performance of the coated substrate in a particular application. In addition, it can be precoated to minimize migration, for example an alumina and/or silica precoat and/or to improve wetability and uniform distribution of the coating materials on the substrate. Further, the zinc oxide component, article can be further coated with a barrier film, organic and/or inorganic to minimize reaction of components such as corrosive gaseous components with the final zinc oxide component/article. In order to provide for controlled electronic conductivity in the doped zinc oxide coating, it is preferred that the substrate be substantially non-electronically conductive when the coated substrate is to be used as a component of acoustic type devices. In one embodiment, the substrate is inorganic, for example glass and/or ceramic. Although the present process may be employed to coat two dimensional substrates, such as substantially flat surfaces, it has particular applicability in coating three dimensional substrates. Thus, the present process provides substantial process advances as a three dimensional process. Examples of three dimensional substrates which can be coated using the present process include spheres such as having a diameter of from about 1 micron to about 500 microns more preferably from about 10 microns to about 150 microns, extrudates, flakes, single fibers, fiber rovings, chopped fibers, fiber mats, porous substrates, irregularly shaped particles, e.g., catalyst supports, multi-channel monoliths, tubes and the like. The substrate for use in polymer composites can be in the form of a particle type shapes set forth above and/or a body of woven or non-woven fibers, particularly, a body of woven or non-woven fibers having a porosity in the range of about 60% to about 95%. Porosity is defined as the percent or fraction of void space within a body of fibers. The above-noted porosities are calculated based on the fibers including the desired doped zinc oxide coating.

The conditions at which each of the steps of the present process occur are effective to obtain the desired result from each such step and to provide a substrate coated with a zinc oxide-containing coating. The substrate/zinc chloride contacting and the substrate/dopant-forming component contacting preferably occur at a temperature in the range of about 290° C. to about 600° C., more preferably about 310° C. to about 400° C. The amount of time during which zinc chloride and/or dopant-forming component is being deposited on the substrate depends on a number of factors, for example, the desired thickness of the zinc oxide-containing coating, the amounts of zinc chloride and dopant-forming component available for substrate contacting, the method by which the zinc chloride and dopant-forming component are contacted with the substrate and the like. Such amount of time is preferably in the range of about 0.1 or 0.5 minutes to about 20 minutes, more preferably about 0.5 or 1 minute to about 10 minutes.

If the coated substrate is maintained in a substantially non-deleterious oxidizing environment, it is preferred that such maintaining occur at a temperature in the range of about 290° C. to about 600° C., more preferably about 310° C. to about 400° C. for a period of time in the range of about 0.05 or 0.1 minutes to about 20 minutes, more preferably about 0.5 or 1 minute to about 10 minutes. The coated substrate/oxidizing agent contacting preferably occurs at a temperature in the range of about 550° C. to about 700° C., more preferably about 600° C. to about 675° C., for a period of time in the range of about 0.05 or 0.1 minutes to about 10 minutes. Additional contacting at a higher temperature up to about 850° C. for a period of up to about 0.5 to about 2 hours can be used to fully develop the electrical conductivity properties. A particular advantage of the process of this invention is that the temperatures used for oxidation have been found to be lower, in certain cases, significantly lower, i.e., 50° to 200° C. than the temperatures required for spray hydrolysis. This is very significant and unexpected, provides for process efficiencies and reduces, and in some cases substantially eliminates, migration of deleterious elements from the substrate to the zinc oxide layer. Excessive ion migration, e.g., from the substrate, can reduce electronic conductivity depending on the substrate and processing condition. In addition, the oxidizing and or sintering steps can be combined with a carbon and/or sulfur source, such as to provide the desired oxides for developing enhanced conduction.

The pressure existing or maintained during each of these steps may be independently selected from elevated pressures (relative to atmospheric pressure), atmospheric pressure, and reduced pressures (relative to atmospheric pressure). Slightly reduced pressures, e.g., less than atmospheric pressure and greater than about 8 psia and especially greater than about 11 psia, are preferred.

The zinc oxide coated substrate, such as the aluminum doped zinc oxide coated substrate, of the present invention may be, for example, a catalyst itself or a component of a composite together with one or more matrix materials. The composites may be such that the matrix material or materials substantially totally encapsulate or surround the coated substrate, or a portion of the coated substrate may extend away from the matrix material or materials.

Any suitable matrix material or materials may be used in a composite with the zinc oxide coated substrate. Preferably, the matrix material comprises a polymeric material, e.g., one or more synthetic polymers, more preferably an organic polymeric material. The polymeric material may be either a thermoplastic material or a thermoset material. Among the thermoplastics useful in the present invention are the polyolefins, such as polyethylene, polypropylene, polymethylpentene and mixtures thereof; and poly vinyl polymers, such as polystyrene, polyvinylidene, combinations of polyphenylene oxide and polystyrene, and mixtures thereof. Among the thermoset polymers useful in the present invention are epoxies, phenol-formaldehyde polymers, polyesters, polyvinyl esters, polyurethanes, melamine-formaldehyde polymers, and urea-formaldehyde polymers.

In order to provide enhanced bonding between the zinc oxide coated substrate and the matrix material, it has been found that the preferred matrix materials have an increased polarity, as indicated by an increased dipole moment, relative to the polarity of polypropylene. Because of weight and strength considerations, if the matrix material is to be a thermoplastic polymer, it is preferred that the matrix be a polypropylene-based polymer which includes one or more groups effective to increase the polarity of the polymer relative to polypropylene. Additive or additional monomers, such as maleic anhydride, vinyl acetate, acrylic acid, and the like and mixtures thereof, may be included prior to propylene polymerization to give the product propylene-based polymer increased polarity. Hydroxyl groups may also be included in a limited amount, using conventional techniques, to increase the polarity of the final propylene-based polymer.

Thermoset polymers which have increased polarity relative to polypropylene are more preferred for use as the present matrix material. Particularly preferred thermoset polymers include epoxies, phenol-formaldehyde polymers, polyesters, and polyvinyl esters.

Various techniques, such as casting, molding and the like, may be used to at least partially encapsulate or embed the zinc oxide coated substrate into the matrix material or materials and form composites. The choice of technique may depend, for example, on the type of matrix material used, the type and form of the substrate used and the specific application involved. One particular embodiment involves pre-impregnating (or combining) that portion of the zinc oxide coated substrate to be embedded in the matrix material with a relatively polar (increased polarity relative to polypropylene) thermoplastic polymer, such as polar engineering thermoplastic resins, prior to the coated substrate being embedded in the matrix material. This embodiment is particularly useful when the matrix material is itself a thermoplastic polymer, such as modified polypropylene, and has been found to provide improved bonding between the zinc oxide coated substrate and the matrix material.

The bonding between the matrix material and the zinc oxide coated substrate is important. In order to provide for improved bonding of the doped zinc oxide coating (on the substrate) with the matrix material, it is preferred to at least partially, more preferably substantially totally, coat the doped zinc oxide coated substrate with a coupling agent which acts to improve the bonding of the doped zinc oxide coating with the matrix. This is particularly useful when the substrate comprises acid resistant glass fibers. Any suitable coupling agent may be employed. Such agents preferably comprise molecules which have both a polar portion and a non-polar portion. Certain materials generally in use as sizing for glass fibers may be used here as a "size" for the doped zinc oxide coated glass fibers. The amount of coupling agent used to coat the doped zinc oxide coated glass fibers should be effective to provide the improved bonding noted above and, preferably, is substantially the same as is used to size bare glass fibers. Preferably, the coupling agent is selected from the group consisting of silanes, silane derivatives, stannates, stannate derivatives, titanates, titanate derivatives and mixtures thereof. As set forth below, such composites are particularly useful in antistatic type applications for example, in static dissipation and electro static recording.

In yet another embodiment, a coated substrate including zinc oxide, preferably electronically conductive zinc oxide, and at least one additional catalyst component in an amount effective to promote a chemical reaction is formed. Preferably, the additional catalyst component is a metal and/or a component of a metal effective to promote the chemical reaction. The promoting effect of the catalyst component may be enhanced by the presence of an electrical field or photo induced electrical field in proximity to the component. Thus, the zinc oxide, preferably on a substantially non-electronically conductive substrate, e.g., a catalyst support, can provide an effective and efficient catalyst for chemical reactions, including those which occur or are enhanced when an photo induced current is applied in proximity to the catalyst component. Thus, it has been found that the present coated substrates are useful as active catalysts and supports for additional catalytic components. Without wishing to limit the invention to any particular theory of operation, it is believed that the outstanding stability, e.g., with respect to electronic properties and/or morphology and/or stability, of the present zinc oxides plays an important role in making useful and effective catalyst materials particularly the higher surface area attainable of copper oxide materials prepared in accordance with this invention, especially when compared to prior art sintering processes. Any chemical reaction, including a chemical reaction the rate of which is electric field or photo enhanced as described herein, may be promoted using the present catalyst component zinc oxide-containing coated substrates. A particularly useful class of chemical reactions are those involving chemical oxidation or reduction. For example, chemical reactions, e.g., dehydrogenation, such as alcohols to ketones, hydrodecyclization, isomerization, ammoxidation, such as with olefins, aldol condensations using aldehydes and carboxylic acids and the like, may be promoted using the present catalyst component, zinc oxide-containing coated substrates. As noted above, it is preferred that the zinc oxide in the catalyst component, zinc oxide-containing substrates be electronically conductive. Although aluminum doped zinc oxide is particularly useful, other dopants may be incorporated in the present catalyst materials to provide the zinc oxide with the desired electronic properties. For example, cobalt may be employed as a zinc oxide dopant. Such other dopants may be incorporated into the final catalyst component, zinc oxide-containing coated substrates using one or more processing techniques substantially analogous to procedures useful to incorporate fluorine dopant, e.g., as described herein.

The zinc oxide-containing coated substrates of the present invention may be employed alone or as a catalyst and/or support in a sensor, in particular gas sensors. Preferably, the coated substrates includes a sensing component similar to the catalyst component, as described herein. The present sensors are useful to sense the presence or concentration of a component, e.g., a gaseous component, of interest in a medium, for example, hydrogen, carbon monoxide, methane and other alkanes, alcohols, aromatics, e.g., benzene, etc., e.g., by providing a signal in response to the presence or concentration of a component of interest, e.g., a gas of interest, in a medium. Such sensors are also useful where the signal provided is enhanced by the presence of an electrical field or current in proximity to the sensing component. The sensing component is preferably one or more metals or metallic containing sensing components, for example, platinum, palladium, silver and zinc. The signal provided may be the result of the component of interest itself impacting the sensing component and/or it may be the result of the component of interest being chemically reacted, e.g., oxidized or reduced, in the presence of the sensing component.

The stability and durability for the present zinc oxide materials are believed to make them very useful as catalysts, sensors.

Any suitable catalyst component (or sensing component) may be employed, provided that it functions as described herein. Among the useful metal catalytic components and metal sensing components are those selected from components of the transition metals, the rare earth metals, certain other catalytic components and mixtures thereof, in particular catalysts containing gold, silver, copper, vanadium, chromium, tungsten, zinc, indium, antimony, the platinum group metals, i.e., platinum, palladium, iron, nickel, manganese, cesium, titanium, etc. Although metal containing compounds may be employed, it is preferred that the metal catalyst component (and/or metal sensing component) included with the coated substrate comprise elemental metal and/or metal in one or more active oxidized forms, for example, $Cr_2O_3$, $Ag_2O$, $Sb_2O_4$, etc.

The preferred support materials include a wide variety of materials used to support catalytic species, particularly porous refractory inorganic oxides. These supports include, for example, alumina, silica, zirconia, magnesia, boria, phosphate, titania, ceria, thoria and the like, as well as multi-oxide type supports such as alumina-phosphorous oxide, silica alumina, zeolite modified inorganic oxides, e.g., silica alumina, and the like. As set forth above, support materials can be in many forms and shapes, especially porous shapes which are not flat surfaces, i.e., non line-of-site materials. A particularly useful catalyst support is a multi-channel monoliths such as one made from corderite which has been coated with alumina. The catalyst materials can be used as is or further processed such as by sintering of powdered catalyst materials into larger aggregates. The aggregates can incorporate other powders, for example, other oxides, to form the aggregates.

The catalyst components (or sensing components) may be included with the coated substrate using any one or more of various techniques, e.g., conventional and well known techniques. For example, metal catalyst components (metal sensing components) can be included with the coated substrate by impregnation; electrochemical deposition; spray hydrolysis; deposition from a molten salt mixture; thermal decomposition of a metal compound or the like. The amount of catalyst component (or sensing component) included is sufficient to perform the desired catalytic (or sensing function), respectively, and varies from application to application. In one embodiment, the catalyst component (or sensing component) is incorporated while the zinc oxide forming component is placed on the substrate. Thus, a catalyst material, such as a salt or acid, e.g., a halide and preferably chloride, oxy chloride and chloro acids, e.g., chloro platinic acid, of the catalytic metal, is incorporated into the zinc chloride-containing coating of the substrate, prior to contact with the oxidizing agent, as described herein. This catalyst material can be combined with the zinc chloride and contacted with the substrate, or it may be contacted with the substrate separately from zinc chloride before, during and/or after the zinc chloride/substrate contacting.

The preferred approach is to incorporate catalyst-forming materials into a process step used to form a zinc oxide coating. This minimizes the number of process steps but also, in certain cases, produces more effective catalysts. The choice of approach is dependent on a number of factors, including the process compatibility of zinc oxide and catalyst-forming materials under given process conditions and the overall process efficiency and catalyst effectiveness.

The zinc oxide/substrate combinations, e.g., the zinc oxide coated substrates, of the present invention are useful in other applications as well. Among these other applications are included the conversion of mechanical movements such as acoustic waves to electricity, porous membranes, resistance heating elements, electrostatic dissipation and recording elements, and electromagnetic interference shielding elements.

In one embodiment, a porous membrane is provided which comprises a porous substrate, preferably an inorganic substrate, and a zinc oxide-containing material in contact with at least a portion of the porous substrate. In another embodiment, the porous membrane comprises a porous organic matrix material, e.g., a porous polymeric matrix material, and a zinc oxide-containing material in contact with at least a portion of the porous organic matrix material. With the organic matrix material, the zinc oxide-containing material may be present in the form of an inorganic substrate, porous or substantially non porous, having a zinc oxide-containing coating, e.g., an electronically conductive zinc oxide-containing coating, thereon.

One particularly useful feature of the present porous membranes is the ability to control the amount of zinc oxide present to provide for enhanced performance in a specific application, e.g., a specific contacting process. For example, the thickness of the zinc oxide-containing coating can be controlled to provide such enhanced performance. The coating process of the present invention is particularly advantageous in providing such controlled coating thickness. Also, the thickness of the zinc oxide-containing coating can be varied, e.g., over different areas of the same porous membrane, such as an asymmetric porous membrane. In fact, the thickness of this coating can effect the size, e.g., diameter, of the pores. The size of the pores of the membrane or porous substrate may vary inversely with the thickness of the coating. The coating process of the present invention is particularly useful in providing this porosity control.

A heating element, for example, a resistance heating element, is provided which comprises a three dimensional substrate having an electrically or electronically conductive zinc oxide-containing coating on at least a portion of all three dimensions thereof. The coated substrate is adapted and structured to provide heat in response, that is, in direct or indirect response, to the presence or application of one or more force fields, for example, magnetic fields, electrical fields or potentials, combinations of such force fields and the like, therein or thereto. An example of such a heating element is one which is adapted and structured to provide heat upon the application of an electrical potential across the coated substrate. Heating elements which are adapted and structured to provide heat in response to the presence of one or more electrical currents and/or electrical fields and/or magnetic fields therein are included in the scope of the present invention. The heat may be generated resistively. In one embodiment, a flexible heating element is provided which comprises a flexible matrix material, e.g., an organic polymeric material as set forth above in contact with a substrate having an electronically conductive zinc oxide-containing coating on at least a portion thereof. The coated substrate is adapted and structured as described above.

In addition, an electrostatic dissipation/recording, electromagnetic interference shielding element is provided which comprises a three dimensional substrate, e.g., an inorganic substrate, having an electronically conductive zinc oxide-containing coating on at least a portion of all three dimensions thereof. The coated substrate is adapted and structured to provide at least one of the following: electrostatic dissipation or recording and/or electromagnetic interference shielding.

A very useful application for the products of this invention is for static, for example, electrostatic, dissipation or recording and shielding, particularly for ceramic and polymeric parts, and more particularly as a means for effecting static dissipation including controlled static charge and/or dissipation and/or discharge such as used in certain electro static painting processes and/or electric field absorption in parts and/or recording, such as parts made of ceramics and polymers and the like, as described herein. The present products can be incorporated directly into the polymer or ceramic and/or a carrier such as a cured or uncured polymer based carrier or other liquid, as for example in the form of a liquid, paste, hot melt, film and the like. These product/carrier based materials can be directly applied to parts to be treated to improve overall performance effectiveness. A heating cycle is generally used to provide for product bonding to the parts. A particular unexpected advantage is the improved mechanical properties, especially compared to metallic additives which may compromise mechanical properties. In addition, the products of this invention can be used in molding processes to allow for enhanced static dissipation and/or shielding properties of polymeric resins relative to an article or device or part without such product or products, and/or to have a preferential distribution of the product or products at the surface of the part for greater volume effectiveness within the part.

The particular form of the products, i.e., fibers, flakes, particles, mats or the like, is chosen based upon the particular requirements of the part and its application, with one or more of flakes, fibers and particles, including spheres, being preferred for polymeric parts. In general, it is preferred that the products of the invention have a largest dimension, for example, the length of fiber or particle or side of a flake, of less than about $\frac{1}{8}$ inch, more preferably less than about 1/64 inch and still more preferably less than about 1/128 inch. It is preferred that the ratio of the longest dimension, for example, length, side or diameter, to the shortest dimension of the products of the present invention be in the range of about 500 to 1 to about 10 to 1, more preferably about 250 to 1 to about 25 to 1. The concentration of such product or products in the product/carrier and/or mix is preferably less than about 60 weight %, more preferably less than about 40 weight %, and still more preferably less than about 20 weight %. A particularly useful concentration is that which provides the desired performance while minimizing the concentration of product in the final article, device or part.

The products of this invention find particular advantage in static dissipation parts, for example, parts having a surface resistivity in the range of about $10^4$ ohms/square to about $10^{12}$ ohms/square. In addition, those parts generally requiring shielding to a surface resistivity in the range of about 1 ohm/square to about $10^5$ ohms/square and higher find a significant advantage for the above products due to their mechanical properties and overall improved polymer compatibility, for example, matrix bonding properties as compared to difficult to bond metal and carbon-based materials. As noted above, the products have the ability to absorb as well as to reflect electro fields. The unique ability of the products to absorb allows parts to be designed which can minimize the amount of reflected electro fields that is given off by the part. This latter property is particularly important where the reflected fields can adversely affect performance of the part.

A flexible electrostatic dissipation/recording/electromagnetic interference shielding element is also included in the scope of the present invention. This flexible element comprises a flexible matrix material, e.g., an organic polymeric material, in contact with a substrate having an electronically conductive zinc oxide-containing coating on at least a portion thereof. The coated substrate of this flexible element is adapted and structured as described above.

The present coating process is particularly suitable for controlling the composition and structure of the coating on the substrate to enhance the performance of the coated substrate in a given, specific application, e.g., a specific resistance heating electrostatic dissipation, recording or electromagnetic interference shielding application.

The present zinc oxide/substrate combinations and matrix material/zinc oxide/substrate combinations, which have at least some degree of porosity, hereinafter referred to as "porous contacting membranes" or "porous membranes", may be employed as active components and/or as supports for active components in systems in which the zinc oxide/substrate, e.g., the zinc oxide coated substrate, is contacted with one or more other components such as in, for example, separation systems, gas purification systems, filter medium systems, flocculent systems and other systems in which the stability and durability of such combinations can be advantageously utilized.

Particular applications which combine many of the outstanding properties of the products of the present invention include porous and electro membrane separations for gas processing, food processing, chemical processing, and bio medical processing. For example, various types of solutions can be further concentrated, e.g., latex concentrated, proteins isolated, colloids removed, salts removed, etc. The membranes can be used in flat plate, tubular and/or spiral wound system design. In addition, the products of this invention can be used e.g., as polymeric composites, for electromagnetic and electrostatic interference shielding applications used for computers, telecommunications and electronic assemblies, as well as in low radar observable systems and static dissipation, for example, in carpeting and in lightning protection systems for aircraft.

Membranes containing voids that are large in comparison with molecular dimensions are considered porous. In these porous membranes, the pores are interconnected, and the membrane may comprise only a few percent of the total volume. Transport, whether driven by pressure, concentration, or electrical potential or field, occurs within these pores. Many of the transport characteristics of porous membranes are determined by the pore structure, with selectivity being governed primarily by the relative size of the molecules or particles involved in a particular application compared to the membrane pores. Mechanical properties and chemical resistance are greatly affected by the nature, composition and structure e.g., chemical composition and physical state, of the membrane.

Commercial micropore membranes have pore dimensions, e.g., diameters, in the range of about 0.005 micron to about 20 microns. They are made from a wide variety of materials in order to provide a range of chemical and solvent resistances. Some are fiber or fabric reinforced to obtain the required mechanical rigidity and strength. The operational characteristics of the membrane are defined sometimes in terms of the molecules or particles that will pass through the membrane pore structure.

Microporous membranes are often used as filters. Those with relatively large pores are used in separating coarse disperse, suspended substances, such as particulate contamination. Membranes with smaller pores are used for sterile filtration of gases, separation of aerosols, and sterile filtration of pharmaceutical, biological, and heat sensitive solutions. The very finest membranes may be used to separate, e.g., purify, soluble macromolecular compounds.

Porous membranes also are used in dialysis applications such a removing waste from human blood (hemodialysis), for separation of biopolymers, e.g., with molecular weights in the range of about 10,000 to about 100,000, and for the analytical measurements of polymer molecular weights. Microporous membranes also may be used as supports for very thin, dense skins or a containers for liquid membranes.

The ability of dense membranes to transport species selectively makes possible molecular separation processes such as desalination of water or gas purification, but with normal thicknesses these rates are extremely slow. In principle, the membranes could be made thin enough that the rates would be attractive, but such thin membranes would be very difficult to form and to handle, and they would have difficulty supporting the stresses imposed by the application. Conversely, microporous membranes have high transport rates but very poor selectivity for small molecules. Asymmetric membranes, for example made of the present combinations, in which a very thin, dense membrane is placed in series with a porous substructure are durable and provide high rates with high selectivity. Such asymmetric membranes and the use thereof are within the scope of the present invention.

Examples of applications for porous membranes include: separation of fungal biomass in tertiary oil recovery; concentration of PVC latex dispersions; desalination of sea water; enhancement of catecholamine determination; removal of colloids from high purity deionized water; treatment of wool scouring liquids; filtration of tissue homogenates; separation of antigen from antigen-antibody couple in immunoassay; purification of subcutaneous tissue liquid extracts; concentration of solubilized proteins and other cellular products; cell debris removal; concentration of microbial suspensions (microbial harvesting); enzyme recovery; hemodialysis; removal of casein, fats and lactose from whey; concentration of albumen; separation of skimmed milk; clarification of liqueur, fruit juices, sugar, and corn syrup; alcohol fermentation; sterilization of liquids, e.g., beer, wine; continuous microfiltration of vinegar; concentration and demineralization of cheese, whey, soy whey, vegetable extracts, and flavorings; sugar waste recovery; silver recovery from photo rinses; dewatering of hazardous wastes; removal of hydrocarbon oils from waste water; recovery and recycling of sewage effluent; recovery of dye stuffs from textile mill wastes; recovery of starch and proteins from factory waste, wood pulp, and paper processing; separation of water and oil emulsions; separation of carbon dioxide and methane; and catalytic chemical reactions.

As described above porous membranes can be used in a wide variety of contacting systems. In a number of applications, the porous membrane provides one or more process functions including: filtration, separation, purification, recovery of one or more components, emulsion breaking, demisting, flocculation, resistance heating and chemical reaction (catalytic or noncatalytic), e.g., pollutant destruction to a nonhazardous form. The resistance heating and chemical reaction functions (applications) set forth herein can be combined with one or more other functions set forth herein for the porous membranes as well as such other related porous membrane applications.

The porous membrane, in particular the substrate, can be predominately organic or inorganic, with an inorganic substrate being suitable for more demanding process environments. Depending upon the application, the zinc oxide film can be provided with a barrier coating on its surface to minimize and/or reduce substantial detrimental outside environmental effects and/or conditions on the zinc oxide surface. The porous organic-containing membranes often include a porous organic based polymer matrix material having incorporated therein a three dimensional zinc oxide-containing material, preferably including an electronically conductive zinc dioxide coating, more preferably incorporating a dopant and/or a catalytic species, in an amount that provides the desired function, particularly electrical conductivity, without substantially deleteriously affecting the properties of the organic polymer matrix material. These modified polymer membranes are particularly useful in porous membrane and/or electromembrane and/or catalytic processes.

Examples of polymer materials useful in microporous membranes include cellulose esters, poly(vinyl chloride), high temperature aromatic polymers, polytetrafluoroethylene, polymers sold by E.I. DuPont Corporation under the trademark Nafion, polyethylene, polypropylene, polystyrene, polyethylene, polycarbonate, nylon, silicone rubber, and asymmetric coated polysulfone fiber.

A very convenient application for the coating process and products of this invention is the production of a controlled coating, e.g., a thin coating of zinc oxide-containing material, on an inorganic substrate, particularly a porous inorganic substrate, to produce a porous membrane. The process provides a new generation of membranes: porous membranes for contacting processes, e.g., as described herein. The selectivity in filtration, particularly ultra and micro filtration, can also be enhanced by applying an electrical field and/or an electrical potential to the porous membrane. The electrical field and/or potential can be obtained using a two electrode electrical system, the membrane including a electronically conductive zinc oxide-containing coating constituting one of the two electrodes (anode or cathode).

Porous multilayer asymmetric electrically conductive inorganic membranes, produced in accordance with this invention, are particularly advantageous for membrane applications. Among the advantages of such membranes are: stability at high temperature and/or at large pressure gradients, mechanical stability (reduced and even substantially no compaction of the membrane under pressure), stability against microbiological attack, chemical stability especially with organic solvents, steam sterilization at high temperatures, backflush cleaning at pressures of up to 25 atm, and stability in corrosive and oxidation environment.

A membrane can be classified as a function of the size of the particles, macromolecules and molecules separated. Micron sized porous ceramics for filtration processes can be prepared through sintering of appropriate materials as set forth herein for the manufacture of sensors. However, the preferred process for membrane-based microfiltration, ultrafiltration and reverse osmosis is to provide inorganic layers with ultrafine pores and thickness small enough to obtain high flux through the membrane, particularly membranes including zinc oxide-containing coatings.

With this type of asymmetric membrane, separation processes are pressure driven. Another factor is the interaction at the membrane interface between the porous material and the material to be processed. As noted above, selectivity can be enhanced by applying an electrical field onto the surface of the membrane. The electrical field is obtained using a two electrode electrical device; the conductive membrane constituting one of the two electrodes (anode or cathode—preferably anode). Such porous membranes can be obtained with one or more electronically conductive zinc oxide-containing thin layers on a porous substrate. Conductive zinc oxide combined with other metal oxide mixtures also provide improved properties for porous membranes and exhibit electronic conductivity, as well as other functions, such as catalysis or resistance heating.

As set forth above, porous membranes with inorganic materials can be obtained through powder agglomeration, the pores being the intergranular spaces. Conflicting requirements such as high flow rate and mechanical stability can be achieved using an asymmetric structure. Thus, an inorganic porous membrane is obtained by superimposing a thin microporous film, which has a separative function, over a thick macroporous support. For example, conductive zinc oxide coating onto the surface of filter media can be used as well as onto the surface of flat circular alumina plates. Coated alumina membranes supported on the inner part of sintered alumina tubes designed for industrial ultrafiltration processes can be used. Tube-shaped supports can be used with varying different chemical compositions, such as oxides, carbides, and clays. Coating of a homogeneous and microporous zinc oxide-containing layer depends on surface homogeneity of the support and on adherence between the membrane and its support. Superior results can be obtained with particulate alumina. The inner part of the tube has a membrane comprising a layer, e.g., in the range of about 10 to about 20 microns thick, with pores, e.g., having diameters in the range of about 0.02 to about 0.2 microns sized for microfiltration purposes. The main feature of such a membrane is uniform surface homogeneity allowing for the zinc oxide-containing coating to be very thin, e.g., less than about one micron in thickness.

The products of this invention, as described herein, are particularly useful for resistance heating applications. It has been found that the coated three dimensional and/or flexible substrates particularly fibers, flakes, particles, including spheres, fiber rovings, chopped fibers, and fiber mats, can be incorporated into polymeric matrix materials, particularly thermoplastic, thermoset and rubber based polymeric materials, as described herein. The zinc oxide coated substrates can be, for example, E, C, S, or T glass, silica, silica alumina, silica alumina boria, silicon carbide or alumina fibers, rovings, mats, chopped mats, etc. What is unexpected is the improved mechanical properties, e.g., strength, coating adhesion and the like, of the coated substrates relative to the prior art substrates coated using spray pyrolysis techniques and the improved control over coating thickness to match conductivity requirements for a given resistance heating application. Whereas for many low to moderate temperature applications, organic polymer matrix materials are preferred, three dimensional products comprising, preferably primarily comprising flexible or rigid inorganic substrates coated with zinc oxide-containing coatings have excellent high temperature performance characteristics useful, for example, in high temperature resistance heating of liquids and gases, such as air, by contact with or through (i.e., porous) such three dimensional products, including multi-channel monoliths. Typical resistance heating applications include: heating elements or units of electric heating devices, devices for culinary purposes, warming tables, therapeutic heaters, deicing devices such as electrically heated polymer composites, low-temperature ovens such as driers, high temperature heating of gases, liquids, etc.

A very useful application for the products of this invention is for the joining of parts, particularly polymeric parts, and as a means for effecting the sintering or curing of parts, such as ceramics, curable polymers, for example thermoset and rubber based polymers and the like. The products can be incorporated directly into the polymer or ceramic and/or a carrier such as a cured or uncured polymer based carrier or other liquid, as for example in the form of a liquid, paste, hot melt, film and the like. These product/carrier based materials can be directly applied to parts to be joined and resistance heating particularly induction heating used to raise the temperature and bond the parts together at a joint such as through polymer melting and/or curing. A particular unexpected advantage is the improved mechanical properties, especially compared to metallic susceptors which may compromise mechanical properties. In addition, the products of this invention can be used in molding processes to preferentially allow the rapid heating and curing of polymeric resins, and/or to have a preferential distribution of the products at the surface of the parts for subsequent joining of parts. The particular form of the products, i.e., fibers, flakes, particles, mats or the like, is chosen based upon the particular requirements of the part and its application, with one or more of flakes, fibers and particles being preferred for joining or bonding parts. In general, it is preferred that the products of the invention have a largest dimension, for example the length of a fiber or side of a flake, of less than about ⅛ inch, more preferably less than about 1/64 inch and still more preferably less than about 1/128 inch. The concentration of such product or products in the product/carrier and/or mix is preferably less than about 50 weight %, more preferably less than about 20 weight %, and still more preferably less than about 10 weight %. A particularly useful concentration is that which provides the desired heating while minimizing the concentration of product in the final part.

A particularly unique application that relies upon stable electronic conductivity and the physical durability of the products of this invention are dispersions of conductive material, such as powders, in fluids, e.g., hydrocarbons, e.g., mineral or synthetic oils, whereby an increase in viscosity, to even solidification, is obtained when an electrical field is applied to the system. These fluids are referred to as "field dependent" fluids which congeal and which can withstand forces of shear, tension and compression. These fluids revert to a liquid state when the electric field is turned off. Applications include dampening, e.g., shock absorbers, variable speed transmissions, clutch mechanisms, etc.

Zinc oxide is particularly useful in applications which require a large electro mechanical coupling coefficient, such as transducers in surface acoustic wave devices and microwave delay lines and various other acoustic and biezo devices. Such properties also have applications in telephone equipment, strain gauges, acoustic optical devices, i.e., laser deflectors and Fourier transform devices.

Certain of these and other aspects the present invention are set forth in the following description of the accompanying drawing.

DETAILED DESCRIPTION OF THE DRAWINGS

The following description specifically involves the coating of randomly oriented, non-woven mats of alumina silica fibers. However, it should be noted that substantially the same process steps can be used to coat other substrate forms and/or materials, such as ceramic fibers and mats.

Figures 1, 6:
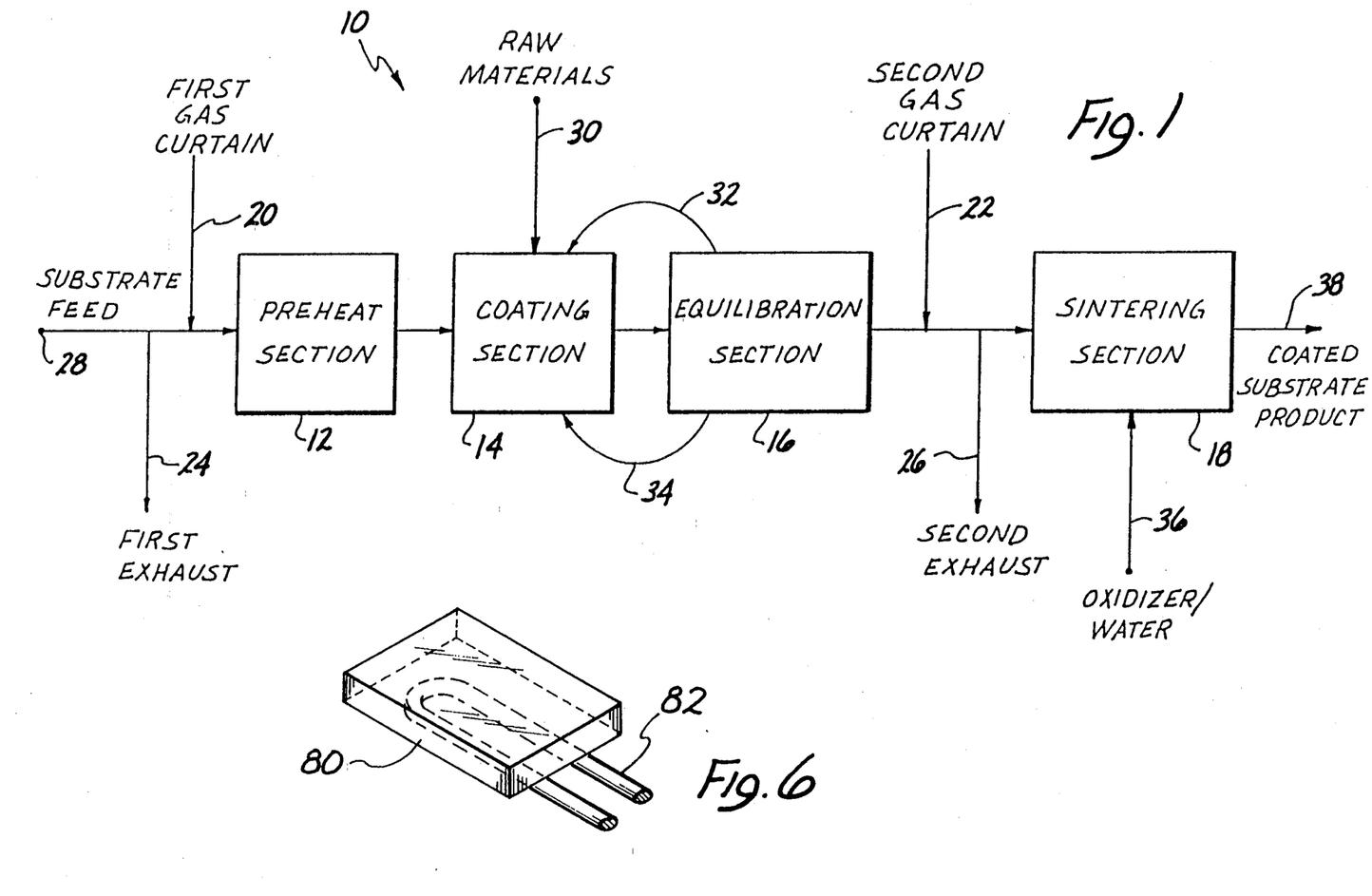
FIG. 1 is a block flow diagram illustrating a process for producing the present coated substrates.
FIG. 6 is a detailed, somewhat schematic illustration of a further embodiment of the heating element of the present invention.

A process system according to the present invention, shown generally at 10, includes a preheat section 12, a coating section 14, an equilibration section 16 and an oxidation/sintering section 18. Each of these sections is in fluid communication with the others. Preferably, each of these sections is a separate processing zone or section.

First gas curtain 20 and second gas curtain 22 provide inert gas, preferably nitrogen, at the points indicated, and, thereby effectively insure that preheat section 12, coating section 14 and equilibrium section 16 are maintained in a substantially inert environment and/or a substantial non-deleterious oxygen environment. First exhaust 24 and second exhaust 26 are provided to allow vapors to exit or be vented from process system 10.

Randomly oriented non-woven mats of silica alumina fibers from substrate source 28 are fed to preheat section 12 where the mats are preheated up to a maximum of 375° C. for a time of 1 to 3 minutes at atmospheric pressure to reach thermal equilibrium. These mats are composed of from 5 micron to about 35 micron diameter silica alumina randomly oriented or woven fibers. The mats are up to 42 inches wide and between 0.058 to 0.174 mil thick. The mats are fed to process system 10 at the rate of about 1 to 5 feet per minute so that the fiber weight throughout is about 0.141 to about 2.1 pounds per minute.

The preheated mats pass to the coating section 14 where the mats are contacted with an anhydrous mixture from raw material source 30. This contacting effects a coating of this mixture on the mats.

This contacting may occur in a number of different ways. For example, the zinc chloride can be combined with nitrogen to form a vapor which is at a temperature of from about 25° C. to about 150° C. higher than the temperature of the mats in the coating section 14. As this vapor is brought into contact with the mats, the temperature differential between the mats and the vapor and the amount of the mixture in the vapor are such as to cause controlled amounts of $ZnCl_2$ to condense on and coat the mats.

Another approach is to apply the $ZnCl_2$ and dopant, for example indium monochloride (liquid and/or colloidal suspension of particles) in a molten form directly to the mats in an inert atmosphere. There are several alternatives for continuously applying the molten mixture to the mats. Obtaining substantially uniform distribution of the mixture on the mats is a key objective. For example, the mats can be compressed between two rollers that are continuously coated with the molten mixture. Another option is to spray the molten mixture onto the mats. The fiber mats may also be dipped directly into the melt. The dipped fiber mats may be subjected to a compression roller step, a vertical lift step and/or a vacuum filtration step to remove excess molten mixture from the fiber mats.

An additional alternative is to apply the $ZnCl_2$ or mixture in an organic solvent. The solvent is then evaporated, leaving a substantially uniform coating on the fiber mats. The solvent needs to be substantially non-reactive (at the conditions of the present process) and provide for substantial solubility of $ZnCl_2$. For example, the dipping solution involved should preferably be at least about 0.1 molar in $ZnCl_2$. Substantially anhydrous solvents comprising acetonitrile, ethyl acetate, dimethyl sulfoxide, propylene carbonate and mixtures thereof are suitable. Although the dopant may be introduced in the sintering section 18, it is preferred to incorporate the dopant in the coating section 14 or the equilibration section 16, more preferably the coating section 14.

Any part of process system 10 that is exposed to $ZnCl_2$ melt or vapor is preferably corrosion resistant, more preferably lined with inert refractory material.

In any event, the mats in the coating section 14 are at a temperature of up to about 600° C., preferable up to about 400° and this section can be operated at slightly less than atmospheric pressure. If the $ZnCl_2$ coating is applied as a molten melt between compression rollers, it is preferred that such compression rollers remain in contact with the fiber mats for about 0.1 to about 2 minutes, more preferably about 1 to about 2 minutes.

After the $ZnCl_2$ coating is applied to the fiber mats, the fiber mats are passed to the equilibration section 16. Here, the coated fiber mats are maintained, preferably at a higher temperature than in coating section 14, in a substantially inert and/or non-deleterious oxygen environment atmosphere for a period of time, preferably up to about 10 minutes, to allow the coating to more uniformly distribute over the fibers. In addition, if the dopant component is introduced onto the fiber mats separate from the zinc chloride, the time the coated fiber mats spend in the equilibration section 16 results in the dopant component becoming more uniformly dispersed or distributed throughout the zinc chloride coating. Further, it is preferred that any vapor and/or liquid which separate from the coated fiber mats in the equilibration section 16 be transferred back and used in the coating section 14. This preferred option, illustrated schematically in FIG. 1 by lines 32 (for the vapor) and 34 (for the liquid) increases the effective overall utilization of $ZnCl_2$ in the process so that losses of these components, as well as other materials such as solvents, are reduced.

The coated fiber mats are passed from the equilibration zone 16 into the sintering zone 18 where such fiber mats are contacted with an oxidizer, such as an oxygen-containing gas, from line 36. The oxidizer preferably comprises a mixture of air and rate accelerating quantities of water vapor, if necessary. This mixture is contacted with the coated fiber mats at atmospheric pressure at a temperature of about 500° C. to about 700° C. for up to about 10 minutes, optionally followed by sintering at a temperature up to about 850° C.—optionally in the presence of a carbon and/or sulfur source. Such contacting results in converting the coating on the fiber mats to a doped zinc dioxide coating. The doped zinc oxide coated fiber mats product, which exits sintering section 18 via line 38, has useful electric conductivity properties. This product preferably has a doped zinc oxide coating having a thickness in the range of about 0.5 microns to about 1 micron, and is particularly useful as a component in static dissipation/shielding applications. Preferably, the product is substantially free of metals contamination which is detrimental to electrical conductivity.

The present process provides substantial benefits. For example, the product obtained has an indium oxide doped zinc oxide coating which has useful properties, e.g., outstanding electrical/mechanical and/or morphological properties. This product may be employed in combination with a metallic catalyst to promote chemical reactions, e.g., chemical reductions, or alone or in combination with a metallic sensing component to provide sensors, e.g., gas sensors. High utilization of zinc chloride and dopant components is achieved. In addition, high coating deposition and product throughput rates are obtained. Moreover, relatively mild conditions are employed. For example, temperatures within sintering section 18 can be significantly less than 900° C. to 1100° C. used in conventional processes. The product obtained has excellent stability and durability.

Figure 2:
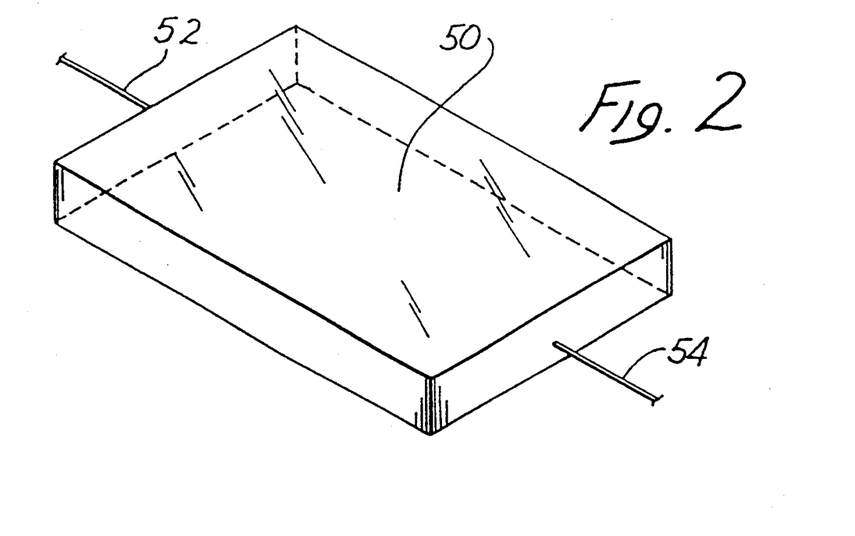
FIG. 2 is a schematic illustration showing an embodiment of the resistance heating element of the present invention.
Figure 3:
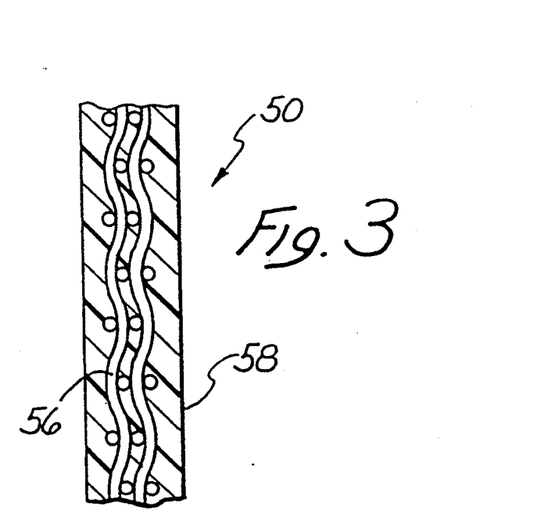
FIG. 3 is a detailed, somewhat schematic illustration of a portion of the resistance heating element shown in FIG. 2.
Figure 4:
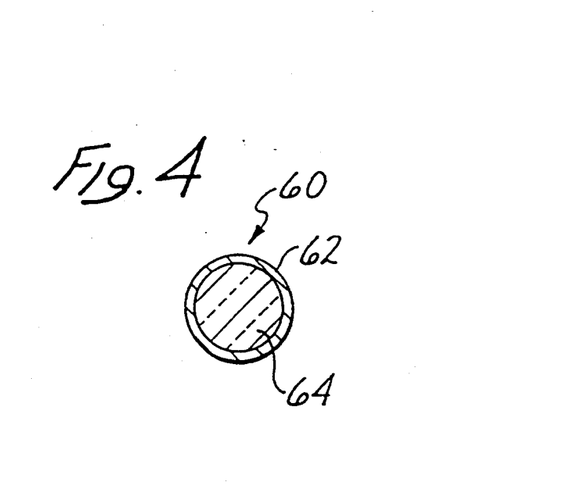
FIG. 4 is a blown-up, cross-sectional view of an individual coated fiber of the coated substrate shown in FIG. 3.

In FIG. 2, a resistance heating element 50 is shown. Element 50 is schematically shown connected to electrical wires 52 and 54 so that an electrical potential can be applied across element 50, in particular across the coated substrate 56 of element 50. Referring to FIG. 3, element 50 is a flexible composite of a coated substrate 56 and a flexible, thermoplastic organic polymeric material 58. Coated substrate 56 is in the form of a glass fiber roving, a three dimensional substrate, and provides an electronically conductive path or network in element 50. As shown in FIG. 4, the individual coated fibers, illustrated by coated fiber 60, of coated substrate 56, are coated with a coating containing aluminum oxide, electronically conductive zinc oxide, illustrated by coating 62 on glass fiber 64.

Figure 5:
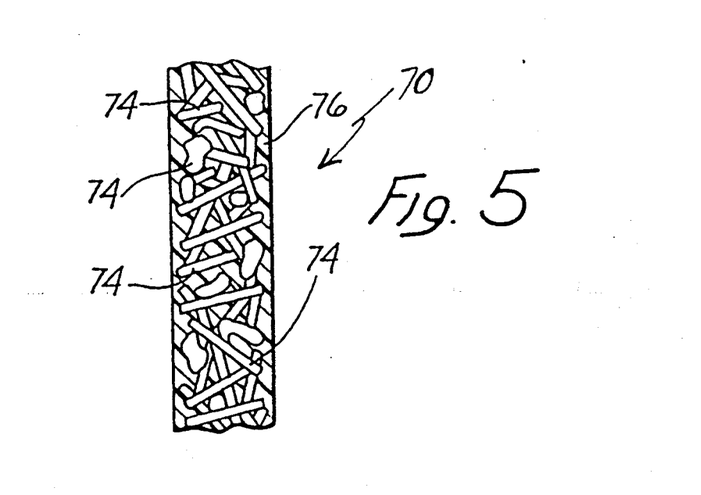
FIG. 5 is a detailed, somewhat schematic illustration of an alternate embodiment of the resistance heating element of the present invention.

Referring to FIG. 5, an alternate resistance heating element 70 is shown. Alternate element 70 can be used in place of element 50 in FIG. 2. Alternate element 70 is a flexible composite of coated substrate particles 74 oriented to provide an electrically conductive path or network in alternate element 70, and a flexible, thermoplastic polymeric matrix material 76. Coated substrate particles 74 are three dimensional particles of various sizes and shapes and are coated with a coating containing tin oxide-doped, electronically conductive zinc oxide. In cross section, each of these particles 74 looks much like individual fiber 60 in FIG. 4.

In FIG. 6, a further heating element 80 is shown. Further element 80 is shown in contact with electrical wire 82 which runs along the underside of element 80. Further element has substantially the same structure as element 50. As alternating electrical current is passed through electrical wire 82, and an alternating magnetic field is created in further element 80. This field gives rise to small scale current loops, known as eddy currents which act to heat the further element 80 resistively. The configuration shown in FIG. 6 is one embodiment of an inductive heating element in accordance with the present invention.

Figure 7:
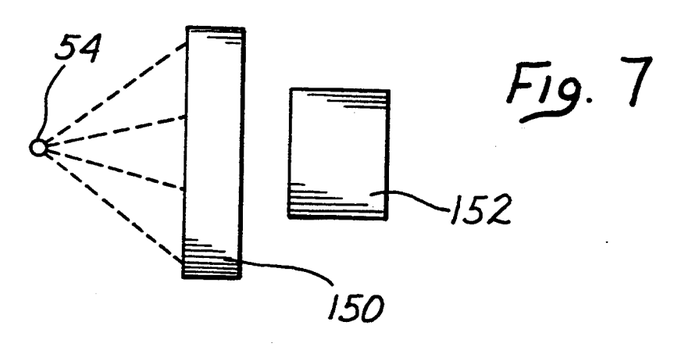
FIG. 7 is a schematic illustration showing an embodiment of the electromagnetic interference shielding element of the present invention in use.

In FIG. 7, an electromagnetic shielding element 150 is shown in use providing electromagnetic interference shielding for first component 152. That is, element 150 is in shielding relation to first component 152 relative to an electromagnetic interference source 154. In particular, element 150 is located between first component 152 and source 154. Element 150 and first component 152 may be parts of the same device, for example, element 150 being a housing for first component 152. Further, element 150 can act upon first component 152 in a shielding relation when first component 152 is a source of electromagnetic interference.

Electromagnetic shielding element 150 is a flexible composite of a coated substrate and a flexible, thermoplastic organic polymeric material. Electromagnetic shielding element 150 is structured similarly to resistance heating element 50, as shown in FIGS. 3 and 4.

Figure 8:
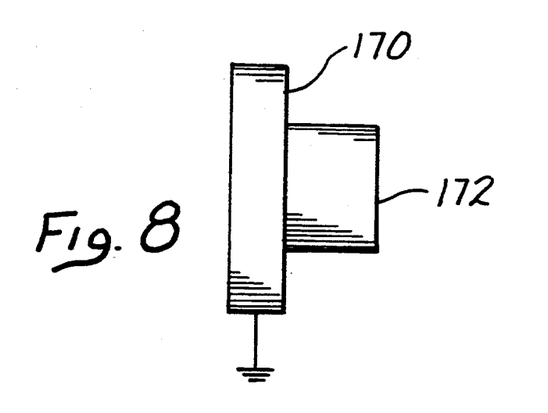
FIG. 8 is a schematic illustration showing an embodiment of the electrostatic dissipation element of the present invention in use.

In FIG. 8, an electrostatic dissipation element 170 is shown in use in contact with second component 172 to provide for dissipation of electrostatic energy. As is conventional, element 170 is grounded. Element 170 and second component 172 may be parts of the same article.

Electrostatic dissipation element 170 is a flexible composite of coated substrate particles oriented to provide an electrically conductive path or network in element 170, and a flexible, thermoplastic polymeric matrix material. Electrostatic dissipation element 170 is structured similarly to alternate resistance heating element 70, as shown in FIGS. 4 and 5.

It should be noted that electromagnetic shielding element 150 can be structured as electrostatic dissipation element 170 is structured and vice versa.

The following non-limiting example illustrates certain aspects of the present invention.

EXAMPLE 1

A substrate made of alumina carbide was contacted with a powder mixture containing 95 mol % $ZnCl_2$ and 5 mol % $SnCl_2$. This contacting occurred at ambient temperature in an air atmosphere at about atmospheric pressure and resulted in a coating containing $ZnCl_2$ and $SnCl_2$ being placed on the substrate.

This coated substrate was then heated to 375° C. and allowed to stand in an argon atmosphere at about atmospheric pressure for about 5 minutes. The coated substrate was then fired at 600° C. for 5 minutes using flowing, at the rate of one (1) liter per minute, water saturated air at about atmospheric pressure followed by 10 minutes sintering at 700° C. This resulted in a substrate having a $SnO_2$ doped zinc oxide coating with excellent electronic properties.

The present methods and products, illustrated above, provide outstanding advantages. For example, the doped zinc oxide coated substrate prepared in accordance with the present invention has improved, i.e., reduced, electronic resistivity, relative to substrates produced by prior methods.

EXAMPLE 2

Zinc chloride powder is applied to a 26 inch by 26 inch silica fiber non woven mat in the form of a powder (10 to 125 microns in average particle diameter) shaken from a powder spreading apparatus positioned 2 to about 5 feet above the mat. An amount of indium mono chloride powder (10 to about 125 microns in average particle diameter) is added directly to the zinc chloride powder to provide a dopant for the final zinc oxide product. The preferred range to achieve low resistance zinc oxide products is about 2% to about 15% by weight of indium chloride, based on the total weight of the powder. The powder-containing mat is placed into a coating furnace chamber at 375° C. and maintained at this temperature for approximately 20 minutes. During this time a downflow of 9.0 liters per minute of nitrogen heated to 350° C. to 450° C. is maintained in the chamber.

In the coating chamber the zinc and indium chloride powder melts and wicks along the fiber to form a uniform coating. In addition, a small cloud of zinc metal chloride vapor can form above the mat. This is due to a small refluxing action in which hot zinc and indium chloride vapors rise slightly and are then forced back down into the mat for coating and distribution by the nitrogen downflow. This wicking and/or refluxing is believed to aid in the uniform distribution of zinc chloride in the coating chamber.

The mat is then moved into the oxidation chamber. The oxidation step occurs in a molecular oxygen-containing atmosphere at a temperature of 525° C. for a period of time of 1 to 5 minutes followed by increasing the temperature to 800° for a period of time of from 10 to 40 minutes in the presence of a sulfur oxide forming source. The mat may be coated by this process more than once to achieve thicker coatings.

EXAMPLE 3

Example 2 is repeated except that the powder is applied to the mat using a powder sprayer which includes a canister for fluidizing the powder and provides for direct injection of the powder into a spray gun. The powder is then sprayed directly on the mat, resulting in a highly uniform powder distribution.

EXAMPLE 4

Example 2 is repeated except that the powder is applied to the mat by pulling the mat through a fluidized bed of the powder, which as an average particle diameter of about 5 to about 125 microns.

EXAMPLE 5 TO 7

Examples 2, 3 and 4 are repeated except that, prior to contacting with the powder, the mat is charged by passing electrostatically charged air over the mat. The powder particles are charged with an opposite charge to that of the mat. The use of oppositely charged mat and powder acts to assist or enhance the adherence of the powder to the mat.

EXAMPLES 8 TO 13

Examples 2 to 7 are repeated except that no indium chloride is included in the powder. Instead, gallium dichloride gas is included in the downflow nitrogen gas in the chamber. The preferred weight of gallium chloride fed to the chamber to achieve low resistance zinc oxide products is in the range of about 1% to about 4% based on the zinc chloride present on the substrate.

In each of the Examples 2 to 13, the final coated mat includes an effectively doped zinc oxide-containing coating having a substantial degree of uniformity.

While this invention has been described with respect to various specific examples and embodiments, it is to be understood that the invention is not limited thereto and that it can be variously practiced within the scope of the following claims.

What is claimed is:

1. An article comprising a three dimensional inorganic substrate other than electrically conductive zinc oxide having a coating containing electrically conductive zinc oxide on at least a portion of all three dimensions thereof produced by a process comprising;
    contacting an inorganic three dimensional substrate which includes external surfaces and shielded surfaces which are at least partially shielded by other portions of said substrate with a composition comprising a zinc oxide-forming compound other than zinc oxide at conditions effective to form a zinc oxide-forming compound containing coating on at least a portion of said substrate;
    forming a liquidus zinc oxide forming compound containing coating on at least a portion of the three dimensions of said substrate including the shielded surfaces of said substrate;
    contacting said substrate with at least one dopant forming component at conditions effective to form a dopant component-containing coating on at least a portion of said substrate including at least a portion of the three dimensions of said substrate including the shielded surfaces of said substrate; said contacting being initiated at least prior to the substantially complete oxidation of said zinc oxide forming compound to zinc oxide;
    contacting said substrate having said zinc oxide forming compound containing coating and said dopant component-containing coating thereon with an oxidizing agent at conditions effective to convert said zinc oxide forming compound to zinc oxide and form a doped zinc oxide coating on at least a portion of said three dimensions of said substrate including the shielded surfaces of said substrate.

2. The article of claim 1 wherein said zinc oxide forming compound is selected from the group consisting of zinc chloride, low molecular weight zinc organic salts, low molecular weight zinc organic complexes and mixtures thereof.

3. The article of claim 1 wherein said zinc oxide forming compound is zinc chloride.

4. The article of claim 1 wherein said dopant-forming component is a dopant oxide precursor selected from the group consisting of aluminum, cobalt, gallium, tin, germanium, chromium, titanium and indium.

5. The article of claim 1 wherein said dopant-forming component is a dopant oxide precursor selected from the group consisting of aluminum, gallium and indium and said zinc oxide forming compound is zinc chloride.

6. The article of claim 1 wherein said substrate is maintained for a period of time at conditions effective to do at least one of the following: (1) coat a larger portion of said substrate with said zinc oxide forming compound: (2) distribute said zinc oxide forming compound over said substrate; (3) make said zinc oxide forming compound-containing coating more uniform in thickness; (4) incorporate said dopant component in said zinc oxide forming compound coating; and (5) distribute said dopant component more uniformly in said zinc oxide forming compound containing coating.

7. The article of claim 1 wherein said substrate is in a form selected from the group consisting of spheres, extrudates, flakes, fibers, fiber rovings, chopped fibers, fiber mats, porous substrates, irregularly shaped particles and multi-channel monoliths.

8. The article of claim 5 wherein said substrate is an inorganic oxide and in a form selected from the group consisting of spheres, extrudates, flakes, fibers, porous substrates, and irregularly shaped particles, and said substrate is substantially non-electrically conductive.

9. An article comprising a three dimensional inorganic substrate other than electrically conductive zinc oxide having a coating containing electrically conductive zinc oxide on at least a portion of all three dimensions thereof produced by a process comprising;
    contacting an inorganic three dimensional substrate which includes external surfaces and shielded portions of said substrate with a composition comprising a zinc chloride-forming compound at conditions effective to form a zinc chloride-forming compound containing coating on at least a portion of said substrate;
    forming a liquidus zinc chloride-forming compound containing coating on at least a portion of the three dimensions of said substrate including the shielded surfaces of said substrate and at conditions effective to do at least one of the following: (1) coat a larger portion of said substrate with said zinc chloride-forming compound (2) distribute said zinc chloride-forming compound over said substrate; and (3) make said zinc chloride-forming compound containing coating more uniform in thickness;
    and contacting said substrate with said zinc chloride-forming compound containing coating with an oxidizing agent at conditions effective to convert the zinc chloride-forming compound to zinc oxide and form a zinc oxide coating on at least a portion of said three dimensions of said substrate including the shielded surfaces of said substrate.

10. The article of claim 9 which further comprises contacting said substrate with a dopant-forming component at conditions effective to form a dopant-forming component containing coating on said substrate, said dopant forming component contacting occurring prior to the substantially complete oxidation of said zinc chloride forming compound to the oxide.

11. The article of claim 9 wherein said substrate is in a form selected from the group consisting of spheres, extrudates, flakes, fibers, fiber rovings, chopped fibers, fiber mats, porous substrates, irregularly shaped particles and multi-channel monoliths.

12. An article comprising a three dimensional inorganic substrate other than electrically conductive zinc oxide having a coating containing electrically conductive zinc oxide on at least a portion of all three dimensions thereof produced by a process comprising;
    contacting an inorganic three dimensional substrate with a composition comprising a zinc oxide precursor powder other than zinc oxide at conditions effective to form a coating containing zinc oxide precursor on at least a portion of the substrate;
    forming a liquidus zinc oxide precursor on at least a portion of the three dimensions of said substrate including the shielded surfaces of said substrate and at conditions effective to do at least one of the following: (1) coat a larger portion of said substrate with said coating containing zinc oxide precursor; (2) distribute said coating containing zinc oxide precursor over said substrate; and (3) make said coating containing zinc oxide precursor more uniform in thickness; and contacting said coated substrate with an oxidizing agent at conditions effective to convert said zinc oxide precursor to zinc oxide on at least a portion of said three dimensions of said substrate including the shielded surfaces of said substrate and form a substrate having a zinc oxide-containing coating.

13. The article of claim 12 which further comprises contacting said substrate with dopant-forming component at conditions effective to from a dopant-forming component-containing coating on said substrate, said dopant-forming component contacting occurring prior to the substantially complete oxidation of said zinc oxide precursor to zinc oxide.

14. The article of claim 12 wherein said zinc oxide precursor is selected from the group consisting of zinc chloride, low molecular weight zinc organic salts, low molecular weight zinc organic complexes and mixtures thereof.

15. The article of claim 14 wherein said zinc oxide precursor is zinc chloride.

16. The article of claim 13 wherein said dopant-forming component is a dopant oxide precursor selected from the group consisting of aluminum, cobalt, gallium, tin, germanium, chromium, titanium and indium.

17. The article of claim 16 wherein said dopant-forming component is a dopant oxide precursor selected from the group consisting of aluminum, gallium and indium, and the zinc oxide precursor is zinc chloride.

18. The article of claim 12 wherein said substrate is selected from the group consisting of spheres, extrudates, flakes, fibers, porous substrates, and irregularly shaped particles and said substrate is substantially non-electrically conductive.

19. The article of claim 17 wherein said substrate is an inorganic oxide and in a form in a from selected from the group consisting of spheres, extrudates, flakes, porous, substrates, and irregularly shaped particles, and said substrate is substantially non-electrically conductive.

20. An article comprising a three dimensional inorganic substrate other than an electrically conductive zinc oxide having a particle type shape which includes external surfaces and shielded surfaces which are at least partially shielded by other portions of said substrate, said substrate having a coating containing electrically conductive doped zinc oxide coating on at least a portion of said three dimensions of said substrate including the shielded surfaces of said substrate.

21. The article of claim 20 wherein said substrate is a shape selected from the group consisting of spheres, extrudates, flakes, fibers, porous substrates, particles and irregularly shaped particles.

22. The article of claim 21 wherein said substrate is an inorganic oxide and in a shaped selected form the group consisting of spheres, extrudates, flakes, porous substrates, particles and irregularly shaped particles.

* * * * *